United States Patent [19]

Sato et al.

[11] 4,233,254

[45] Nov. 11, 1980

[54] PROCESS FOR GRANULATING METAL SULFIDE POWDERS

[75] Inventors: Haruki Sato; Yoshio Kawasumi, both of, Urawa, Japan

[73] Assignee: Nihon Kogyo Kabushiki Kaisha, Tokyo, Japan

[21] Appl. No.: 972,649

[22] Filed: Dec. 22, 1978

[30] Foreign Application Priority Data

Jan. 9, 1978 [JP] Japan .................................. 53/530

[51] Int. Cl.³ .............................................. B01J 2/10
[52] U.S. Cl. ...................................... 264/37; 264/117
[58] Field of Search .................................. 264/37, 117

[56] References Cited

U.S. PATENT DOCUMENTS

| | | | |
|---|---|---|---|
| 2,919,184 | 12/1959 | Osswald et al. | 264/37 |
| 3,711,254 | 1/1973 | McGowan et al. | 264/117 |

Primary Examiner—Donald J. Arnold
Assistant Examiner—James R. Hall
Attorney, Agent, or Firm—Seidel, Gonda, Goldhammer & Panitch

[57] ABSTRACT

A process for granulating metal sulfide powders comprises the steps of adding a solution of thermosetting resin in a volatile organic solvent, as a binder, to a metal sulfide powder as the starting material, forming the mixture thus obtained into granules by a granulator, drying the granulation product, sieving the dried product for classification and recovering the granules within desired limits of particle size, recycling the fines after the sieve classification, with the addition of only the volatile organic solvent, as the material, and heating the granules within the desired limits of particle size for curing. Coarse particles separated out by the sieve classification are pulverized and recycled as the material, with the addition of only the volatile organic solvent.

15 Claims, No Drawings

PROCESS FOR GRANULATING METAL SULFIDE POWDERS

BACKGROUND OF THE INVENTION

This invention relates to a process for granulating metal sulfide powders, and more specifically to a process for forming the powder of a metal sulfide, such as molybdenum disulfide or tungsten disulfide, into granules within desired limits of particle size.

Self-lubricating parts such as those of oilless bearings have usually been fabricated by mixing the powder of copper, tin, or other metal, as the base, with the powder of a solid lubricant, pressing the mixture in dies to produce compacted shapes, and sintering the shapes. While the solid lubricant powder is available in many different kinds, the powders of metal sulfides having layer crystalline structures, such as molybdenum disulfide and tungsten disulfide, may be cited as typical examples. It is because of their ideal layer structures that such two disulfides are particularly useful as solid lubricants. Such a solid lubricant powder, if directly added to the powder of the base metal powder, would not give a good self-lubricating product, for a number of reasons including the infeasibility of achieving uniform mixing and the low strength attained on sintering. As an alternative, therefore, composite powders consisting of solid lubricant particles coated with copper, nickel, or other metal have frequently been employed.

Metal sulfide powders commercially available mostly take the form of fine particles that pass the 400-mesh sieve. Responsible for this fineness are limitations in the processes for preparation. In the case of natural products, the powders are purified by flotation, and synthesized products are subjected to a process for elimination of by-products, and in either process only very fine particles will result. When a metal sulfide powder consisting of such fines is added as a solid lubricant to a base metal powder and the mixture is compacted with pressure, the addition in a sufficient amount for producing an adequate lubrication effect would cause a sharp decrease in the strength of the sintered compact. For example, a base metal powder of a copper-tin system, with the addition of 3–5% by weight of the metal sulfide powder, will give a sintered product with little improvement in the self-lubricating capability. The addition of more than 8–10% by weight for the first time will produce a lubrication effect but the strength of the product will be seriously low. For this reason it is desirable to granulate the solid lubricant, prior to the addition, to a particle size ranging from 4 to 400 mesh, for example.

As mentioned above, coating of metal sulfide particles with a second metal is a modern practice for improving the lubricating ability of the sintered product without the strength penalty. In the preparation of such a composite powder, the yield of coating varies extremely with the particle size of the particular metal sulfide powder to be coated. To cite one example, the production yield of a copper-coated molybdenum disulfide powder by the addition of a copper sulfate solution and iron powder to molybdenum disulfide powder is at most 80% when the particle size of the disulfide powder is finer than 400 mesh, whereas the yield soars to over 99% with disulfide particles in the range from −4 to +400 mesh. When using a metal sulfide powder in the composite form, therefore, it is more effective to coat the sulfide particles granulated in advance than coating the powder as such.

Another justification for granulation is the fact that the individual particles of commercially available metal sulfide powders are flat shaped with many projections. If the particles are directly coated, the second metal will preferentially deposit on the projections, making the coated film uneven, or causing rounding off of the particles during washing, drying and other processing, thereby producing finer particles anew. Even when the metal coating is not done, problems, such as formation of fines, un-uniformity of mixing, and low sintered strength, can arise. Thus, prior granulation of such flat particles having many projections is beneficial in that the projections are eliminated and the individual particles are made spherical.

As will be appreciated from the foregoing description, it is necessary to granulate and size the fine metal sulfide powder of commerce to a desired range of particle size before its addition as a solid lubricant, either directly as it is or in the form of composite powder, to the base metal powder.

No attempt has hitherto been made to granulate metal sulfide powders. The object of granulation herein contemplated is to convert very fine powders of less than 400 mesh into granules sized within the range from 5 to 400 mesh. Unlike pelletization or the like that does not require closeness in size, the granulation in accordance with the invention calls for careful considerations. Granulation of fine powdery materials other than metal sulfides, e.g., carbon black, have been in practice. The conventional methods of granulation are generally classified into wet processes which involve addition of water and dry processes in which the material powder is compressed, compacted, and broken to pieces. None of the processes have, however, proved satisfactory, because of a cumbersome after treatment, large proportion of excessively coarse particles, uneven particle size, and/or low yield of product. With these shortcomings, the ordinary processes do not give favorable result when applied to the granulation of metal sulfide powders.

BRIEF SUMMARY OF THE INVENTION

After diversified investigations, we have now successfully developed an appropriate process for granulating metal sulfide powders.

Briefly, this invention provides a process for granulating metal sulfide powders, which comprises the steps of (a) adding a solution of thermosetting resin in a volatile organic solvent, as a binder, to a metal sulfide powder as the starting material, (b) forming the mixture obtained in the step (a) into granules by a granulator, (c) drying the granulation product, (d) sieving the dried product for classification and recovering the granules within desired limits of particle size, (e) recycling the fines after the sieve classification for granulation with the addition of only the volatile organic solvent, and (f) heating and curing the granules within the desired limits of particle size.

Coarse particles separated out by the sieve classification may be pulverized and reused for granulation with the addition of only the volatile organic solvent. The solvent recovered in the drying step may be recycled, too. The granulator to be employed is preferably an equipment that combines the functions of granulation and pulverization, e.g., "Henschel mixer" (trade designation of a mixer mfd. by Mitsui Miike Machinery Co.)

DETAILED DESCRIPTION

The invention will now be described in more detail.

The metal sulfide powders to be processed in accordance with the invention are commercially available ones, smaller in particle size than the granules desired, usually finer than 400 mesh. The shape and bulk density of the powder made available for use offer no problem.

As the binder, a resol and/or novolak type phenol resin is preferred, although synthetic resins of the thermosetting type have substantially the same effects. The binder is employed in the form of a resin dissolved in a volatile organic solvent, and the solvent may be any substance which dissolves the resin used and which is volatile itself. For this purpose methanol is usually used by reason of economy and reusability. The amounts of the binder and solvent to be added depend on the particle size and shape of the starting material powder, desired particle size, type of the granulator to be used, and other factors. In consideration of these, proper amounts must be chosen. With the binder, a rule of thumb is to add from 3 to 30% by weight, generally about 30% by weight, of the total powder weight. The solvent is desirably added in an amount sufficient for the solid-liquid system after the mixing to attain a fluidity between the funicular (I) and (II) regions. The terms "funicular (I) and (II)" regions are herein used in accordance with the indication practice in the art which classifies the state of packing and fluidity of solid-liquid systems into five stages, as tabulated below for reference:

| Region | Solid phase | Liquid phase | Condition | Fluidity |
|---|---|---|---|---|
| (1) Pendular | Continuous | Discontinuous | Loose | Dilatant dispersion |
| (2) Funicular (I) | Continuous | Continuous | " | Pseudoplastic dispersion |
| (3) Funicular (II) | Continuous | Continuous | " | Plastic dispersion |
| (4) Capillary | Discontinuous | Continuous | Viscous | Shear-hardened dispersion |
| (5) Slurry | Discontinuous | Continuous | Muddy | False body dispersion |

Although a granulator of any construction and type, e.g., the rolling, vibrating, or fluidizing type, may be employed, one that combines the both functions of pulverization and granulation is preferred for the purposes of the invention. In order to minimize the growth of too coarse particles during granulation, it is desirable to employ a granulator so designed as to operate as such while, at the same time, pulverizing the coarse particles. In this sense, the Henschel mixer works effectively.

Kneading of the mixture by a kneader prior to the granulation and after the addition of the binder gives good result.

Under the conditions specified above, the powdery material is granulated, and the granules taken out of the granulator are dried to enhance the efficiency of the subsequent process of sieve classification. The drying is intended for removal of the volatile content, and a suitable temperature must be used according to the kinds of resin and solvent used. Also, the temperature must be lower than the level at or above which hardening reactions, such as condensation, proceed actively. For instance, where a resol type phenol resin is employed as the binder and methanol as the solvent, partial hardening occurs at about 100° C., and therefore the drying temperature is desirably at a lower level, e.g., about 50° to 70° C. The drying may be regarded to have come to an end when the granules are dry enough to be sieved subsequently without the possibility of clogging, and a drying time of about 30 minutes to about one hour is generally sufficient. The solvent once evaporated can be recovered and recycled.

The dried particles are classified by sieving in the usual manner. The upper and lower limit sieves are chosen depending on the desired range of particle size. After the sieving, coarse particles too large to pass the upper limit sieve and fines that pass the lower limit sieve are recovered as well as the particles within the proper limits of size. Of course, the latter is recovered as the product and sent to subsequent steps of the process.

The coarse and fine particles outside the desired range of particle size may be handled in some different ways according to the limitations of the facilities to be used. Most basically, those undesired fractions are put together, and the mixture is pulverized and granulated again. Where the granulator available is only one, those fractions may be mixed with the fresh material and pulverized and granulated altogether. Separately handling the coarse and fine particles is more desirable, however. The operation cycle of pulverization and granulation is repeated until 95% or more of the starting material powder comes within the target range of particle size. Each time such fractions out of the limits are returned to the granulator, a suitable amount of a solvent is added.

Apparently the most desirable procedure for recycling the excessively coarse and fine particles is to return the coarse particles to the granulator after pulverizing them while returning the fines as such to the granulator for reuse.

Although there is no special limitation to the type of the granulator for the coarse particles, it is necessary to choose the conditions for pulverization so that at least from 20 to 30% by weight of the charge is disintegrated to fines smaller than the desired particle size. In the case when water is used in the pulverization, drying of the product before its recycling is essential. The pulverization product of coarse particles and the fine particles may be mixed and regranulated together with, or independently of, the fresh material powder. In some cases, the pulverization and granulation of the coarse particles and the granulation of the fines may be accomplished as separate steps of the process.

In the repeated granulation of the coarse and fine particles, which are already coated with the binder, it is only necessary to add the solvent in an amount just necessary to dissolve the binder. The conditions for addition generally conform to those employed for the initial granulation.

Finally, at least 95% of the starting material powder is granulated and sized within the desired limits. The granules thus obtained are put together and completely hardened by curing with heat. The temperature, time, atmosphere, and other conditions for curing must be suitably selected according to the kinds and sizes of the resin and metal sulfide powder as the starting material. In practice of the invention, the use of a nitrogen atmosphere has been found useful in avoiding the oxidation of the starting material during the course of removal of free $H_2O$, phenol, and formalin. In a curing experiment, molybdenum disulfide was employed as the metal sulfide powder, and a resol type phenol resin as the binder. Curing in air or a nitrogen atmosphere at 120°-300° C. for 0.5-2.0 hours gave good result.

The granular metal sulfide powder prepared in this way is used either in the form coated with a second metal or directly as a solid lubricant powder.

EXAMPLE

One thousand grams of a commercially available molybdenum disulfide (of a technical grade manufactured by Amax Co.) was pulverized and granulated. The material was charged into a Henschel mixer and, with the addition of a binding-granulating agent prepared by dissolving 167 g of a phenol resin (with 100 g solid contents) in 80 ml of methanol, the charge was subjected to the pulverization and granulation for about 10 minutes. After drying at 70° C. for 0.5 hour, the granulation product was classified by sieving to obtain 400 g of molybdenum disulfide powder granulated within a range of particle size between $-150$ and $+250$ mesh. The particles coarser than 150 mesh are pulverized to $-150$ mesh by a pulverizer (Eck atomizer). The combination of the pulverized particles and the particles finer than 250 mesh was charged once more into the Henschel mixer and, with the addition of 40 ml methanol, the charge was again pulverized and granulated. After the sieving, the above-described procedure was repeated until about 95% of the starting material powder of molybdenum disulfide was granulated within the particle size range from $-150$ to $+250$ mesh. The granulated powder was cured at 120° C. for one hour and at 300° C. for further one hour, and again classified by sieving, when 980 g of molybdenum disulfide granulated and sized within the limits of $-150$ to $+250$ mesh resulted. The particles thus obtained were spherical and uniform in shape.

As has been described above, the present invention provides a novel process for granulating metal sulfide powders. By the granulation of solid lubricant powders of metal sulfides that has not been tried yet, the metal sulfides can now be added, either directly or as metal-coated composite powders of proper sizes, to base metal powders, rendering it possible to fabricate self-lubricating sintered products of high quality. The granulation process according to the invention makes possible the recovery of over 95% of the starting material powder in the form of granules within the target range of particle size, and also permits the recovery and reuse of the solvent employed. As compared with the wet and dry granulation processes commonly in use, the process of the invention is simplified in steps, each in process control without the need of such cumbersome treatments as water evaporation and repulverization of lumps, and ensures the production of high grade granules.

What is claimed is:

1. A process for granulating metal sulfide powders, which comprises the steps of
   (a) adding and mixing a solution of thermosetting resin in a volatile organic solvent, as a binder, to a metal sulfide powder as the starting material,
   (b) forming the mixture obtained in the step (a) into granules by a granulator,
   (c) drying the granules at a temperature below the hardening temperature of said thermosetting resin,
   (d) sieving the dried granules for classification and recovering the granules within desired limits of particle size,
   (e) recycling the fines after the sieve classification to the granulator with the addition of said volatile organic solvent, and
   (f) heating and curing said granules within the desired limits of particle size.

2. A process of claim 1 wherein the metal sulfide powders are powders of molybdenum disulfide or tungsten disulfide.

3. A process of claim 1 wherein the thermosetting resin is resol or novolak type phenol resin.

4. A process of claim 1 wherein the solvent is methanol.

5. A process of claim 1 wherein the binder is employed in an amount of about 3 to 30% by weight based on the total powder weight.

6. A process of claim 5 wherein the solvent is added in an amount sufficient for the starting material of step (a) after the mixing to attain a fluidity between the funicular (I) and (II) regions.

7. A process of claim 1 wherein the granulator is of the type having the functions of pulverization and granulation.

8. A process of claim 1 wherein in step (c) the solvent is recovered and recycled to the step (a).

9. A process of claim 1 wherein the drying is carried out at a temperature of about 50° to 70° C.

10. A process of claim 1 wherein the recycled fines from step (e) are mixed with fresh metal sulfide powder and granulated altogether.

11. A process of claim 1 wherein the recycled fines from step (e) are granulated separately from recycled coarse particles and fresh metal sulfide powder.

12. A process of claim 1 wherein the curing is effected at a temperature of about 120° to 300° C. for 0.5 to 2.0 hours in air or nitrogen atmosphere.

13. A process for granulating metal sulfide powders, which comprises the steps of
    (a) adding and mixing a solution of thermosetting resin in a volatile organic solvent, as a binder, to a metal sulfide powder as the starting material,
    (b) forming the mixture obtained in the step (a) into granules by a granulator,
    (c) drying the granules at a temperature below the hardening temperature of said thermosetting resin,
    (d) sieving the dried granules for classification and recovering the granules within desired limits of particle size,
    (e) recycling the fines after the sieve classification to the granulator with the addition of said volatile organic solvent,
    (f) separating coarse particles by said sieve classification, disintegrating said particles so that at least 20 to 30 percent by weight are rendered smaller than the desired particle size, and recycling the resulting powder to the granulator with the addition of said volatile organic solvent, and
    (g) heating and curing said granules within the desired limits of particle size.

14. A process of claim 13 wherein the recycled particles from the steps (e) and (f) are mixed with fresh metal sulfide powder and granulated altogether.

15. A process of claim 13 wherein the recycled particles from the steps (e) and (f) are combined and granulated.

* * * * *